M. A. Gates.
Check-Rein Attachment.
No. 72,284. Patented Dec. 17, 1867.
Witnesses
Theo Cusche
W. Frewen
Inventor.
M A Gates
Per J Munn
Attorney

United States Patent Office.

M. A. GATES, OF TROY, PENNSYLVANIA.

Letters Patent No. 72,284, dated December 17, 1867.

---

IMPROVED CHECK-REIN ATTACHMENT.

---

The Schedule referred to in these Letters Patent and making part of the same.

---

TO ALL WHOM IT MAY CONCERN:

Be it known that I, M. A. GATES, of Troy, in the county of Bradford, and State of Pennsylvania, have invented a new and improved Check-Rein Attachment; and I do hereby declare that the following is a full, clear, and exact description thereof, which will enable those skilled in the art to make and use the same, reference being had to the accompanying drawing, forming part of this specification.

The figure is a perspective view of a horse harnessed, illustrating my invention.

My invention has for its object to furnish an improved check-rein attachment for harness, which shall be so constructed and arranged that the horse can be unchecked or allowed to lower his head to drink without its being necessary for the driver to get out of the carriage; and it consists in the combination of the check-rein hook, turret-ring, stop-ring, hook-ring, end ring, hook, and straps, with each other, when used in connection with the check-rein, pad or saddle, and back-strap of the harness, and in attaching a hook to the butt-end of the whip, the whole being constructed and arranged as hereinafter more fully described.

A is the turret-ring, which is screwed into the saddle or pad of the harness in the same manner as the ordinary check-rein hook is now attached. B is the check-rein hook, which is attached to the forward end of the strap C. The strap C passes through the turret-ring A, and thence back, along the back-strap of the harness, through the stop-ring D, which is secured to the back-strap; and its rear end is attached to the hook-ring E, which should be of such a size as to pass through the stop-ring D. F is a strap, the forward end of which is attached to the hook-ring E, and to the rear end of which is attached the ring G. H is a hook, which is attached to the rear end of the back-strap, as shown in the drawing, or to the crupper-strap. The top ring D and the hook E I prefer to make square. I represents the butt-end of the whip, to the end of which is attached a hook, J, as shown in the drawing.

In using the attachment, the hook-ring E is hooked upon the hook H. The strap C is then adjusted so as to bring the check-rein hook B back to the turret-ring A. When the driver wishes to let his horse drink, he reaches the butt-end of his whip forward, and takes hold of the end ring G with the hook J, and raises the hook-ring E away from the hook H. Then, as the horse lowers his head to drink, he draws the strap C forward through the turret-ring A, and through the stop-ring D, until the end ring G reaches the said stop-ring D, through which it cannot pass, being made larger than the stop-ring. When the horse has finished drinking, the driver takes hold of the end ring G with the hook J, and draws it back until he can drop the hook-ring E over the hook H, and the horse is again checked up ready to be driven forward.

Having thus described my invention, I claim as new, and desire to secure by Letters Patent—

The combination of the check-rein hook B, strap C, turret-ring A, stop-ring D, hook-ring E, strap F, end ring G, and hook H, with each other, when used in connection with the check-rein, saddle or pad, and back-strap of a harness, substantially as herein shown and described, and for the purpose set forth.

The above specification of my invention signed by me, this 5th day of October, 1867.

M. A. GATES

Witnesses:
JAMES T. GRAHAM,
J. ALISON FRASER.